Nov. 19, 1935.  F. MIESS  2,021,667
ACCELERATION INDICATING DEVICE
Filed April 23, 1934  2 Sheets-Sheet 2
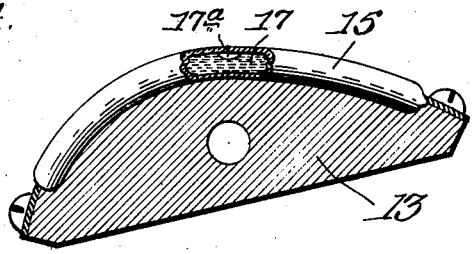
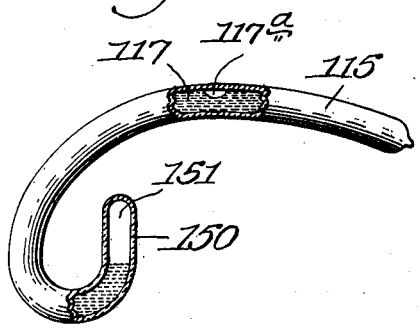
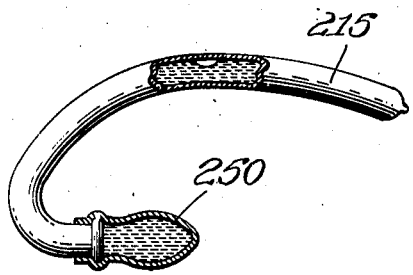
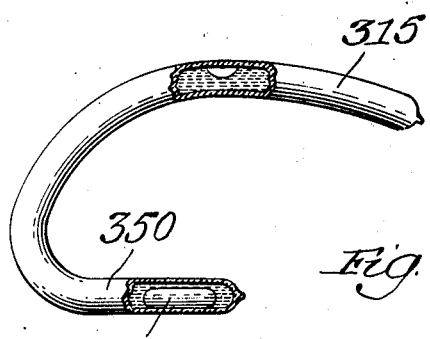
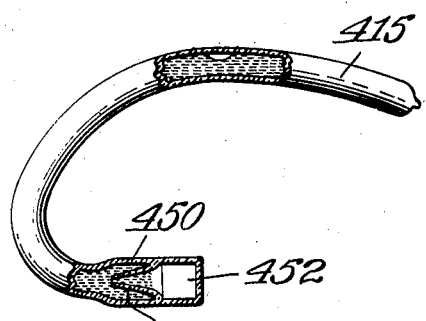
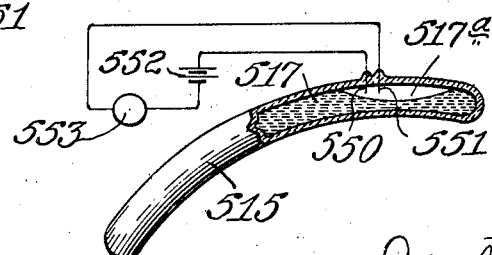
Inventor:
Fred Miess,
By Dyrenforth, Lee, Chritton and Wiles,
Attys.

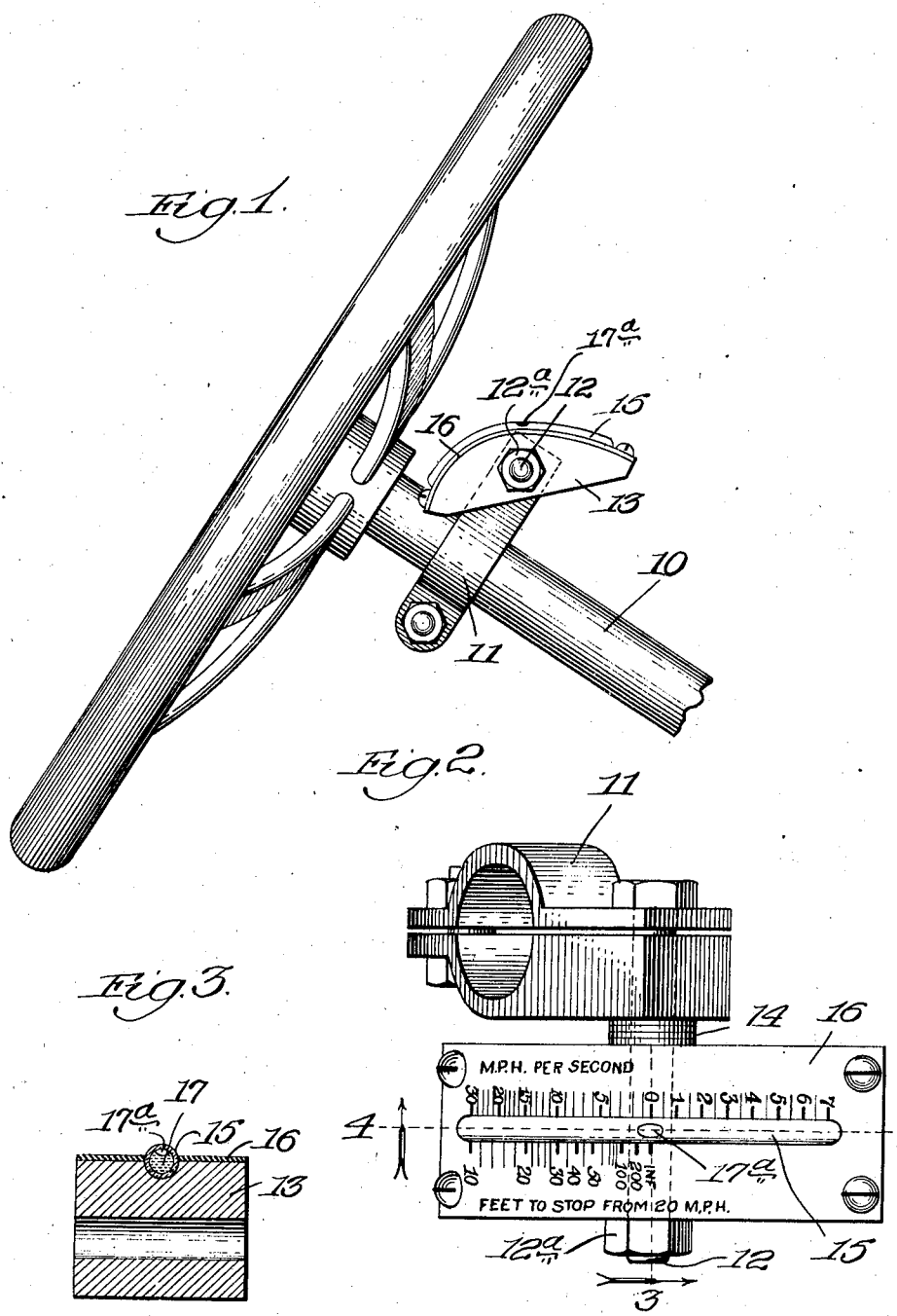

Patented Nov. 19, 1935

2,021,667

UNITED STATES PATENT OFFICE 2,021,667

ACCELERATION INDICATING DEVICE

Fred Miess, Gary, Ind.

Application April 23, 1934, Serial No. 721,997

15 Claims. (Cl. 264—1)

This invention relates to improvements in acceleration indicating devices and, more especially, such a device for indicating the accelerations, both positive and negative, of a vehicle, as, for example, a motor vehicle, airplane, or the like. I prefer to use the term negative acceleration, although this is sometimes referred to as deceleration, or retardation.

Among the features of my invention is the provision of such a device especially adapted for indicating positive acceleration from, say, zero to seven miles per hour per second and negative acceleration from, say, zero to thirty miles per hour per second. I have found that these ranges substantially cover most motor vehicles; and my improved device is well adapted for use on such vehicles.

By the use of my improved device it is possible to note the positive acceleration obtainable under different conditions and thus gauge the performance and power output of the motor, the state of lubrication and condition of the bearings, and other conditions of the vehicle. Likewise, by observing the negative acceleration obtainable, it is possible to gauge the efficiency and condition of the brakes, the traction of the wheels, and other contributing factors.

My improved device is simple in construction and operation; easy and cheap to manufacture; and simple to install and maintain. Its performance will be found to be reasonably accurate under all conditions.

I also provide means for mounting the device on a steering column of a motor vehicle, such means permitting easy and quick adjustment to the proper operating position.

Other features and advantages of my invention will appear more fully as I proceed with my specification.

In those forms of devices embodying the features of my invention shown in the accompanying drawings—

Figure 1 is a view in side elevation; Fig. 2 is a top plan view; Fig. 3 is a view taken as indicated by the line 3 of Fig. 2; Fig. 4 is a view taken as indicated by the line 4 of Fig. 2; Figs. 5, 6, 7, and 8 are diagrammatic views illustrating modified forms embodying means for counteracting thermal expansion or contraction of the liquid in the device; and Fig. 9 is a modified form showing signaling means for indicating negative acceleration.

As shown in the drawings, 10 may indicate the steering column of a motor vehicle upon which my improved device may be mounted, as by means of the clamp 11. This clamp carries the bolt 12 upon which the block 13 is adjustably carried. The block 13 can be rotated on the bolt to put it in the proper operating position and held there by tightening the nut 12ª on the bolt. Suitable spacing washers 14 may be interposed between the block 13 and clamp 11.

The upper surface of the block 13 is convexly curved and provided with a longitudinal groove in which is mounted the convexly curved glass tube 15, the latter being held in the groove by the curved plate 16.

The tube 15 is filled with liquid 17, with the exception of a bubble 17ª at the top (when the device is stationary).

In the operation of the device, the bubble will move forwardly with positive acceleration and rearwardly with negative acceleration, the distance moved depending upon the degree of such acceleration.

The ends of the tube need not necessarily be curved as long as they slope or are slanted; but if not curved, of course, the intermediate accelerations between zero and the maximum will not be satisfactorily shown.

The range of the instrument can be made as desired by making the tube with the proper slope, slant, curvature or length. The curvature itself need not be circular but can be of any desired shape to give any desired calibrations. For simplicity, I have here shown the tube with a circular curvature, although I have used different radii for the front and back portions or ends of the tube. With a shorter radius and correspondingly greater curvature a greater range will be covered by the same length of tubing; and, consequently, I have shown the curvature of the rear portion of the tube, indicating negative acceleration, as being greater than the forward portion used for indicating positive acceleration. The negative acceleration of an ordinary motor vehicle usually covers a greater range than its positive acceleration. When a circular curvature is used, the calibrations will not be equally spaced; but it is to be understood that the curvature of the tube may be such as to give equally spaced calibrations.

Any suitable calibrations may be provided. For example, as here shown, calibrations are provided on or adjacent the tube 15 to indicate the acceleration as shown by the position of the bubble 17ª. For example, as shown in Fig. 2, these calibrations on the plate 16 may indicate the various positive accelerations from zero to seven miles per hour per second and the negative accelerations, from zero to thirty miles per hour per second. I have found that these ranges will cover the needs of the ordinary motor vehicle. In the drawings, I have made no attempt to show the calibrations as they would actually be located, the drawings being merely diagrammatic in this respect. As shown in Fig. 2, the negative acceleration may also be calibrated to show the feet required to bring the vehicle to a stop from a speed of twenty miles per hour.

The liquid 17 is preferably a non-freezing substance with a low coefficient of thermal expansion. If desired, however, means may be provided for counteracting, to a certain extent, thermal influences. Some of these are suggested in Figs. 5, 6, 7, and 8.

In Fig. 5 the tube 115 corresponding to the tube 15 is provided with an upturned extension 150 at one end, in which is trapped a relatively large amount of air, or other gas, 151, so that expansion or contraction of the liquid 117 will not seriously affect the size of the relatively small bubble 117ª.

In Fig. 6 the tube 215 is provided with an elastic bag 250 at one end to absorb changes in volume of the liquid.

In Fig. 7, the tube 315 is provided with an extension 350 containing a collapsible gas-filled capsule 351 to absorb changes in volume of the liquid.

In Fig. 8, the tube 415 is provided with an extension 450 containing a capillary restriction 451 communicating with an air space 452. The capillary tube prevents the liquid from freely flowing into the air space 452 but permits expansion and contraction of the air confined therein with volumetric changes of the liquid.

In Fig. 9, I have shown means by which negative acceleration will operate a signal. This will permit the device to be operated as a "stop light" to indicate to a following motorist that retardation or a stop is contemplated. As here shown, the forward curved portion of the tube is omitted because I am illustrating a device for indicating negative acceleration only. The tube is indicated by 515. This tube contains a liquid 517 which is a suitable conductor of electricity, for example, mercury. The bubble at the top is indicated by 517ª. 550, 551 indicate terminals in the tube, of the electric circuit including the source of electrical energy 552 and any suitable signal, for example, a light 553. When negative acceleration of a certain degree occurs, the bubble 517ª will move backwardly until the mercury closes the circuit between the terminals 550 and 551. This will display the signal light 553 which may be placed in a position to be visible to a motorist in the rear. In this type, the tube can quite satisfactorily be made straight, instead of curved, and properly sloped or slanted, since it is not necessary to indicate the intermediate negative accelerations between zero and that for which the instrument is designed to operate the signal.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

Any suitable liquid may be used in the device, for example, water, alcohol, oil, or the like. In case of use in low temperatures, some non-freezing liquid like alcohol is preferable to water. The bubble referred to is merely an absence of the liquid. It is unimportant as to what the bubble consists of. Ordinarily, the bubble may be air, or merely an absence of the liquid used. In many cases, of course, the gas composing the bubble will be more or less laden with vapor from the liquid. It is to be understood, also, that any float such as wood, cork, or the like, is the equivalent of a bubble. A change of speed causes the bubble to move because of the inertia or momentum of the liquid. For example, in the case of positive acceleration, the inertia of the liquid causes it to tend to move backwardly in the tube, thus causing the bubble to move forwardly. In case a curved tube is used, the bubble does not move to the end of the tube with any change in speed because of the curvature of the tube. A given acceleration will move the bubble to a certain position on the slope of the tube. That is, where the tube is curved so that the slope is not the same at all places, any given acceleration will move the bubble to a certain position so that the slope just balances the acceleration. In the case, however, of a slanting straight tube, the bubble will remain at one end until a certain acceleration is reached sufficient to overcome the slope when it will move entirely to the other end.

What I regard as new, and desire to secure by Letters Patent, is:

1. A device of the character described, including; a transparent tube; means for mounting said tube longitudinally in a vehicle with its forward end sloping downwardly; liquid in said tube, filling the same with the exception of a bubble; and calibrations for indicating positive acceleration by the position of the bubble.

2. A device of the character described, including; a transparent tube; means for mounting said tube longitudinally in a vehicle with its rear end sloping downwardly; liquid in said tube, filling the same with the exception of a bubble; and calibrations for indicating negative acceleration by the position of the bubble.

3. A device af the character described, including; a curved transparent tube; means for mounting said tube longitudinally in a vehicle with its forward end curved downwardly; liquid in said tube, filling the same with the exception of a bubble; and calibrations for indicating positive acceleration by the position of the bubble.

4. A device of the character described, including; a curved transparent tube; means for mounting said tube longitudinally in a vehicle with its rear end curved downwardly; liquid in said tube, filling the same with the exception of a bubble; and calibrations for indicating negative acceleration by the position of the bubble.

5. A device of the character described, including; a non-straight transparent tube; means for mounting said tube longitudinally in a vehicle with its ends sloping downwardly; liquid in said tube, filling the same with the exception of a bubble; and calibrations for indicating positive and negative acceleration by the position of the bubble.

6. A device of the character described, including; a curved transparent tube; means for mounting said tube longitudinally in a vehicle with its ends curved downwardly; liquid in said tube, filling the same with the exception of a bubble; and calibrations for indicating positive and negative acceleration by the position of the bubble.

7. A device as claimed in claim 6, in which the curvature of the rear end is greater than that of the forward end.

8. A device for indicating positive acceleration from zero to substantially five miles per hour per second and negative acceleration from zero to substantially twenty miles per hour per second, comprising a transparent tube filled with liquid with the exception of a bubble at the top, the ends of said tube sloping downwardly, and calibrations for indicating positive and negative acceleration by the position of the bubble.

9. A device for indicating positive acceleration from zero to substantially five miles per hour per second and negative acceleration from zero to substantially twenty miles per hour per second, comprising a transparent tube filled with liquid with the exception of a bubble at the top, the ends of said tube curving downwardly, and calibrations for indicating positive and negative acceleration by the position of the bubble.

10. A device as claimed in claim 1, with means for compensating for volumetric changes in the liquid.

11. A device as claimed in claim 1, in which the tube is provided with an extension having a gas confined therein.

12. A device as claimed in claim 1, in which the tube is provided with an upturned extension having a gas confined therein.

13. A device as claimed in claim 1, in which the tube is provided with an expansible portion.

14. A device as claimed in claim 1, in which the tube is provided with an expansible end.

15. A device as claimed in claim 1, in which the tube contains a gas-filled collapsible capsule.

FRED MIESS.